United States Patent [19]

Filter et al.

[11] 3,890,172

[45] June 17, 1975

[54] SOLID PROPELLANT COMPOSITION WITH AZIRIDINE CURED EPICHLOROHYDRIN POLYMER BINDER

[75] Inventors: Harold E. Filter, Midland; Harvey D. Bidlack, Shepherd; Don L. Stevens, Sanford, all of Mich.

[73] Assignee: The Dow Chemical Company, Midland, Mich.

[22] Filed: Nov. 29, 1968

[21] Appl. No.: 780,945

[52] U.S. Cl. .................. 149/19.6; 149/36; 149/44; 260/2 A; 260/2 EN; 260/2 BP
[51] Int. Cl. .................................................. C06d 5/06
[58] Field of Search ............ 149/19, 36, 44, 60, 61, 149/76, 83, 19.6; 260/2 A, 2 EN, 2 BP

[56] References Cited
UNITED STATES PATENTS

| | | | |
|---|---|---|---|
| 3,305,413 | 2/1967 | Flynn et al. | 149/19 |
| 3,376,175 | 4/1968 | Sheeline | 149/19 |
| 3,441,520 | 4/1969 | Bosniack et al. | 260/2 |
| 3,480,488 | 11/1969 | Rudy et al. | 149/7 |
| 3,502,618 | 3/1970 | Velzmann et al. | 260/47 |

*Primary Examiner*—Benjamin R. Padgett
*Assistant Examiner*—E. A. Miller
*Attorney, Agent, or Firm*—L. S. Jowanovitz

[57] ABSTRACT

The present disclosure relates to novel solid propellant compositions containing a light metal or light metal hydride as fuel, a high energy perchlorate oxidizer, and a binder comprising a homopolymerized epoxy-based resin, or various systems of polymers and copolymers cured with aziridine-based resins.

3 Claims, No Drawings

SOLID PROPELLANT COMPOSITION WITH AZIRIDINE CURED EPICHLOROHYDRIN POLYMER BINDER

BACKGROUND OF THE INVENTION

Solid propellant compositions employed for propulsion of rockets and missiles presently consist of an oxidizer, fuel, and binder material which holds the active ingredients together. As new high-energy oxidizers are developed, presently employed binder systems have proved to be incompatible with many of the new materials and degradation or premature ignition during fabrication and/or storage of the solid propellant composition has frequently resulted.

It is a primary object of the present invention to provide a polymeric binder system which is compatible with high energy perchlorate oxidizers.

This and other objects and advantages of the present invention will become apparent from the following description thereof.

SUMMARY OF THE INVENTION

The present invention is a propellant composition comprising from about 5 to about 80 percent of an oxidizer, from about 80 to about 5 percent of a fuel, and from about 5 to about 30 percent of a polymeric binder system, said percentages being on a weight basis.

Generally any commonly employed oxidizer such as the alkali metal and ammonium chlorates, perchlorates, or nitrates, and inorganic oxides can be employed in the present invention. However, part of the unique utility of the present invention stems from the fact that high energy perchlorate oxidizers such as nitronium perchlorate, hydroxyl amine perchlorate, hydrazinium perchlorate and hydrazinium diperchlorate, which are normally incompatible with polymeric binders ordinarily employed, can also be compatibly employed therein in conjunction with high energy fuels such as particulate aluminum, beryllium, boron, lithium, magnesium, alloys thereof, and aluminum hydride, beryllium hydride, boron hydride, lithium hydride and magnesium hydride.

Binder systems which can be employed in the present invention are homopolymerized epoxy-based resins, and saturated chloro-hydroxyl containing polymers cured with an aziridine-based resin.

Suitable homopolymerized epoxy binders are based on the glycidyl ethers of polyhydroxylated aliphatic and aromatic compounds such as the glycidyl ethers of glycerine, pyrolgallol, resorcinol, ethylene glycol, propylene glycol, and dihydroxylated benzene derivatives.

The glycidyl ethers can be readily prepared by one skilled in the art by employing commonly known synthesis techniques such as the reaction between epichlorohydrin and hydroxyl groups in the presence of base to yield the glycidyl ether of the hydroxyl-containing compound. In the presence of an oxidizer and/or fuel, the glycidyl ethers readily homopolymerize at ambient temperatures in from 1 to 5 days time to yield a hard solid propellant grain.

Where the binder system is a chloro-hydroxy-containing polymer cured with an aziridine-based resin, any saturated polymer containing both the chloro- and hydroxyl groups with a molecular weight ranging from about 200 to 5,000 can be employed. Particularly suitable polymers are polyepichlorohydrin and copolymers of epichlorohydrin and ethylene oxide or propylene oxide wherein from about 1 to about 70 percent by weight of the copolymer is ethylene oxide or propylene oxide, and the balance is epichlorohydrin.

In denoting the relationship in the binder system between the polymer or copolymer and the aziridine-based resin an aziridine equivalent/hydroxyl equivalent ratio is employed. The aziridine equivalent is defined as the gram molecular weight of the resin employed divided by the average number of aziridine groups per molecule of resin. The hydroxyl equivalent is defined as the gram molecular weight of chloro-hydroxy-containing polymer employed divided by the number of hydroxyl groups present per molecule of binder. Normally, the aziridine equivalent/hydroxyl equivalent ratio ranges from about 0.05 to about 2.0.

Aziridine based curing agents which can be employed in the present invention are of tris[2-alkyl-1-aziridinyl]phosphine oxide, wherein the alkyl group is methyl or ethyl, tris[1-aziridinyl]phosphine oxide (hereinafter described as APO), bis(1-aziridinyl)phosphinate terminated polyglycol oxides corresponding to the structural formula:

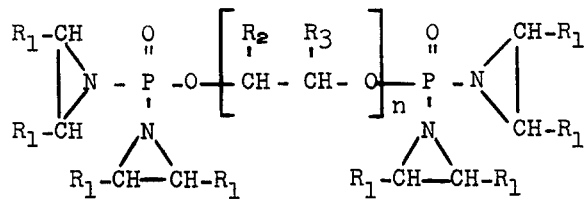

wherein $n$ is an integer ranging from 1 to 5; $R_1$ is —H, —$CH_3$ or $C_2H_5$; $R_2$ is —H, —$CH_3$ or —$C_2H_5$; and $R_3$ is —H, —$CH_3$ or $C_2H_5$, tris[2-(alkyl-substituted-1-aziridinyl)ethyl]-benzenetricarboxylates corresponding to the structural formula:

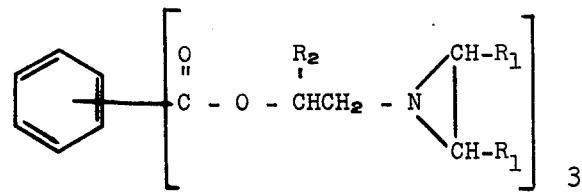

wherein $R_1$ can be —H, —$CH_3$ or —$C_2H_5$; and $R_2$ can be —H, or an alkyl group containing from one to three carbon atoms, and triaziridinyl melamine corresponding to the formula:

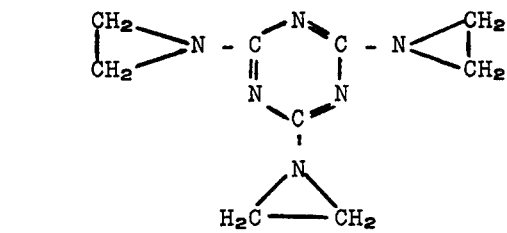

Generally to fabricate the solid propellant compositions of the present invention, the components are admixed at ambient temperatures and cured at slightly elevated temperatures of from about 50°C to about 100°C until a solid, substantially void-free solid propellant grain is produced. All fabrication steps are carried out in an inert atmosphere such as a substantially anhydrous argon or nitrogen atmosphere.

DESCRIPTION OF THE PREFERRED EMBODIMENTS

A preferred embodiment of the present invention is a solid propellant composition wherein by weight from about 50 to about 75 percent is a member selected from the group consisting of hydrazinium diperchlorate, hydrazinium perchlorate, hydroxylamine perchlorate and nitronium perchlorate, as oxidizer, from about 5 to about 30 percent is a member selected from the group consisting of aluminum, boron, beryllium, lithium and magnesium, or hydrides of these elements, as fuel, and from about 10 to about 30 percent is a binder consisting of polyepichlorohydrin with a molecular weight ranging from about 300 to about 750, cured with a bis(aziridinyl phosphinate terminated)polyglycol corresponding to the structural formula:

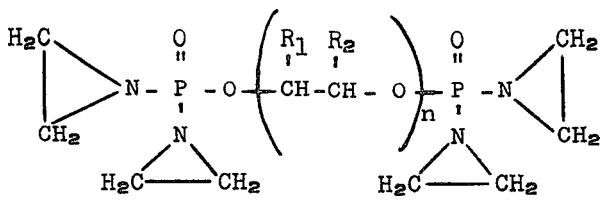

wherein $R_1$ is —H, or —$CH_3$, $R_2$ is —H, or —$CH_3$, and $n$ is an integer ranging from 1 to 3.

Generally the aziridine equivalent/hydroxyl equivalent ratio ranges from about 0.50 to about 2.0.

The solid propellant composition also consists of from about 0.1 to about 3.0 percent by weight of a cure catalyst which is a member selected from the group consisting of boron trifluoride etherate, and tertiary amines.

A solid-propellant composition is fabricated from the above-described materials by admixing the polyepichlorohydrin, cure catalyst, and aziridine-based curing agent until substantially homogeneous, heating the so-homogenized blend for from about 0.1 to about 1 hour at from about 40°C to about 80°C, and cooling the mixture to ambient temperatures whereupon said fuel and oxidizer are carefully blended into the cooled mixture. The resulting mass is cured at ambient temperatures to yield a firm elastomeric solid propellant grain.

Another preferred embodiment is the solid propellant composition employing fuel and oxidizer components substantially similar to those described directly above, and consisting by weight of from about 50 to about 75 percent oxidizer, from about 5 to about 30 percent fuel, and from about 10 to about 30 percent of a polyepichlorohydrin binder with a molecular weight ranging from about 300 to about 750, cured with an azirdine-based curing agent corresponding to the formula:

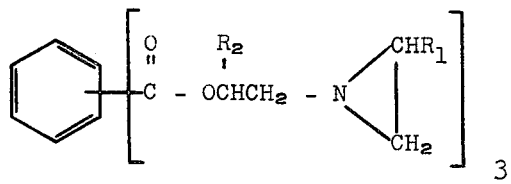

wherein the benzene nucleus is substituted in the 1,2, and 4 positions thereby forming a derivative of mellitic acid, and wherein $R_1$ is —H, $CH_3$, or $C_2H_5$. The aziridine equivalent/hydroxyl equivalent ratio ranges from about 0.5 to about 2.0.

To fabricate the solid propellant composition of the present invention, the polyepichlorohydrin binder and curing agent are admixed until substantially homogeneous, and the fuel and oxidizer are blended into the so-homogenized mixture and the resulting mass is cured at from about 50°C to about 90°C for from about 24 to about 50 hours to yield a substantially void-free solid propellant grain.

Still another preferred embodiment of the present invention is the solid propellant composition wherein the fuel and oxidizer are similar to those employed in the preferred embodiments set forth hereinabove. Said solid propellant composition consists on a weight basis of from about 50 to about 75 percent oxidizer, about 5 to about 30 percent fuel, and from about 10 to about 30 percent of a member selected from the group consisting of polymerized diglycidyl glycerine ethers, diglycidyl pyrogallol ethers, as binder.

Generally, the above-described epoxidized materials will contain small amounts of aberrational epoxidized compounds such as compounds wherein part of the available hydroxyl groups have not reacted to yield the epoxy derivative. Therefore, in referring to epoxidized compounds it should be understood that a pure compound is not specified, but rather a mixture is indicated which is substantially equivalent to the pure compound for purposes of the present invention.

To fabricate the solid propellant composition consisting of the above-described materials, the oxidizer, fuel, and epoxidized compound are admixed until substantially homogeneous, and homopolymerization takes place at ambient temperature after from about 1 to about 5 days to yield a solid propellant grain. All fabrication steps were carried out in a substantially inert atmosphere, such as a dehydrated argon atmosphere.

EXAMPLE 1

A solid propellant was prepared in which the curing agent was a tris-1,2,4-[(-aziridinyl)ethyl]benzenetricarboxylate corresponding to the structural formula:

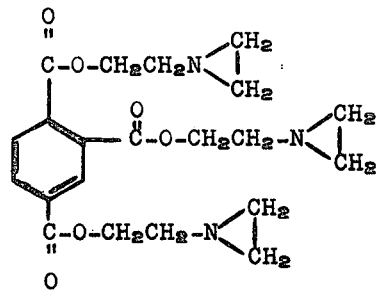

About 0.64 grams of a polyepichlorohydrin of about 1150 molecular weight was admixed with about 0.36 grams of said curing agent, and the resulting mixture was agitated until substantially homogeneous. To the so-homogenized blend was added about 0.70 grams of particulate aluminum fuel and again the mixture was agitated until substantially homogeneous. To the so-homogenized fuel-containing mixture was added about 3.25 grams of hydrazinium diperchlorate oxidizer. The formulation was cured at about 80°C for about 48 hours to yield a solid void-free propellant grain. During mixing or curing, the reagents did not evidence incompatibility as by the evolution of gaseous degradation products.

The cured propellant was exposed in a circulating air oven at about 150°F for about 28 days during which time no visible changes occurred.

EXAMPLE 2

A solid propellant employing a homopolymerized epoxy resin as binder can be prepared by admixing about 1.0 grams of substantially diglycidylized glycerine, and about 0.5 grams of a high energy perchlorate oxidizer. The mixture can be cured at ambient temperatures in up to about 4 days to yield a hard solid. All formulation and curing steps should be carried out in a substantially inert dehydrated argon or nitrogen atmosphere.

The cured solid propellant grain is stable when exposed to normal atmospheric conditions.

EXAMPLE 3

Studies were carried out which proved that the binder systems of the present invention were compatible with high energy perchlorate oxidizers. In many cases, a fuel was not added to the formulation, but since compatibility of fuel and oxidizer combined is not a problem, one skilled in the art could readily prepare solid propellant compositions of the present invention employing both fuel and oxidizer.

A formulation was prepared utilizing a bis[(1-aziridinyl)phosphinate terminated] polyethylene glycol corresponding to the structural formula:

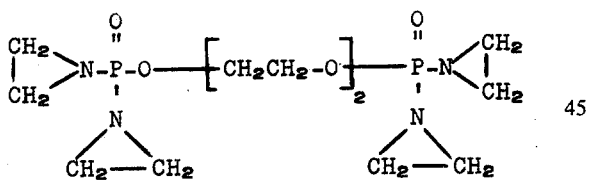

About 2.47 grams of a polyepichlorohydrin of about 1,150 molecular weight, about 0.92 grams of said curing agent, and about 0.1–0.5 grams of a boron trifluoride etherate curing catalyst were admixed until substantially homogeneous. The so-homogenized blend was heated to about 75°C for about 20 min. and about 1–5 grams of nitronium perchlorate oxidizer was blended into the mixture. Curing took place at ambient temperatures within about 3 days to yield a firm, elastomeric, solid propellant grain. All formulation and curing steps were conducted in a substantially inert, dehydrated argon or nitrogen atmosphere. Upon exposure to a normal atmosphere the composition proved to be stable.

We claim:

1. A solid propellant composition comprising on a weight basis:
   A. from about 50 to about 75 percent of a member selected from the group consisting of hydrazinium perchlorate, hydrazinium diperchlorate, hydroxyl amine perchlorate, nitronium perchlorate and alkali metal or ammonium nitrate, chlorates or perchlorates as oxidizer;
   B. from about 5 to about 30 percent of a member selected from the group consisting of aluminum, beryllium, lithium, magnesium, alloys thereof, and aluminum hydride, beryllium hydride, boron hydrides, lithium hydride, and magnesium hydride, as fuel, and
   C. from about 10 to about 30 percent of a polymeric binder system comprising a chloro-hydroxy polymer cured with an aziridine-based resin selected from the group consisting of:
      a. tris[2-alkyl-1-aziridinyl]phosphine oxide, wherein the alkyl substituent group is methyl or ethyl,
      b. tris[1-aziridinyl]phosphine oxide,
      c. bis(1-aziridinyl) phosphinate terminated polyglycol oxides having the general formula:

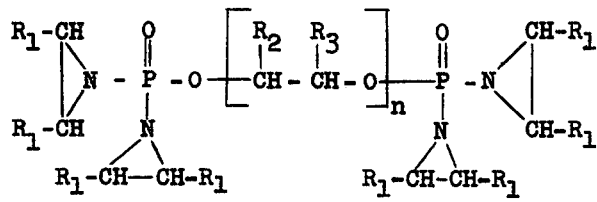

wherein $n$ is an integer ranging from 1 to 5; $R_1$ is —H, —CH$_3$, or C$_2$H$_5$; $R_2$ is —CH$_3$, or C$_2$H$_5$; and $R_3$ is —H, —CH$_3$, or C$_2$H$_5$, d. tris[2-(alkyl-substituted-1-aziridinyl)-ethyl]benzenetricarboxylates corresponding to the structural formula:

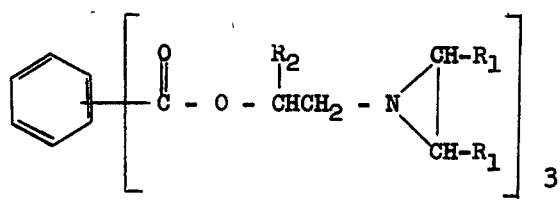

wherein $R_1$ is —H, —CH$_3$ or —C$_2$H$_5$; and $R_2$ is —H, —CH$_3$ or —C$_2$H$_5$, and e. triaziridinyl melamine, and wherein the polymer is a member selected from the group consisting of,
         1. polyepichlorohydrin,
         2. copolymers of epichlorohydrin and from about 1 to about 70 percent of ethylene oxide or propylene oxide.

2. A composition as in claim 1 wherein the binder is polyepichlorohydrin with a molecular weight of from 300 to 750 cured with a bis(1-aziridinyl)-phosphinate terminated polyglycol oxide of the general formula:

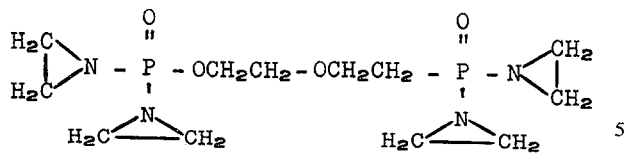
said binder also comprising from 0.1 to 3.0 percent of boron trifluoride ethereate or a tertiary amine, as a cure catalyst.
3. A composition as in claim 1 wherein the binder comprises polyepichlorohydrin with a molecular weight of from 300 to 750 cured with a tris-1,2,4-benzenetricarboxylate corresponding generally to the structural formula:
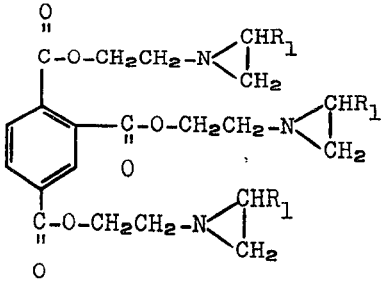
wherein $R_1$ is —H, —$CH_3$ or —$C_2H_5$.
* * * * *